(12) United States Patent
Joehl et al.

(10) Patent No.: US 7,342,485 B2
(45) Date of Patent: Mar. 11, 2008

(54) MOTOR VEHICLE ROOF WITH A CONTROL MEANS FOR ELECTRICAL MOTOR VEHICLE COMPONENTS AND PROCESS FOR OPERATING ELECTRICAL MOTOR VEHICLE COMPONENTS

(75) Inventors: Anton Joehl, Bad Heilbrunn (DE);
Joachim Klesing, Eichenau (DE);
Thomas Rudolph, Hechendorf (DE);
Michael Eder, Landsberg (DE)

(73) Assignee: Webasto AG, Stockdorf (DE)

( * ) Notice: Subject to any disclaimer, the term of this patent is extended or adjusted under 35 U.S.C. 154(b) by 343 days.

(21) Appl. No.: 10/845,071

(22) Filed: May 14, 2004

(65) Prior Publication Data

US 2004/0227625 A1     Nov. 18, 2004

(30) Foreign Application Priority Data

May 15, 2003   (DE)   ................................ 103 21 964

(51) Int. Cl.
 *B60Q 1/00* (2006.01)
(52) U.S. Cl. ............. 340/438; 340/426.25; 340/426.28
(58) Field of Classification Search ................ 340/438, 340/426.13, 426.15, 426.22, 426.24, 426.25, 340/426.27, 426.28, 815.47; 359/265, 267; 318/445, 449; 296/223
See application file for complete search history.

(56) References Cited

U.S. PATENT DOCUMENTS

| | | | |
|---|---|---|---|
| 6,031,465 A * | 2/2000 | Burgess | ..................... 340/5.54 |
| 6,198,175 B1 | 3/2001 | Kalb et al. | |
| 6,388,410 B1 * | 5/2002 | Hohn | .......................... 318/445 |
| 6,614,579 B2 * | 9/2003 | Roberts et al. | ............. 359/267 |
| 6,617,975 B1 * | 9/2003 | Burgess | ................. 340/815.47 |
| 7,063,379 B2 * | 6/2006 | Steuer et al. | ................ 296/223 |

FOREIGN PATENT DOCUMENTS

| | | |
|---|---|---|
| DE | 42 01 934 A1 | 7/1993 |
| DE | 43 12 672 A1 | 10/1994 |
| DE | 196 49 573 A1 | 6/1998 |
| DE | 198 45 030 A1 | 4/2000 |
| DE | 100 08 197 C1 | 7/2001 |
| DE | 100 22 321 A1 | 11/2001 |
| DE | 100 36 394 A1 | 2/2002 |
| GB | 2 418 741 A * | 1/2004 |
| JP | 363235138 A * | 9/1988 |
| WO | WO 03/016110 A2 | 2/2003 |

OTHER PUBLICATIONS

Patent Abstracts of Japan; Publication No. 10236243A; Date of Publication of Application Aug. 9, 1998; Applicant: Yazaki Corp.; English Abstract.

* cited by examiner

*Primary Examiner*—Van T. Trieu
(74) *Attorney, Agent, or Firm*—David S. Safran

(57) ABSTRACT

A motor vehicle roof with a control for comfortable operation of at least one motor vehicle component by a passenger of the vehicle, the control having a sensor surface arrangement (12g) for detecting the presence and/or movement of the hand or part of the hand of the passenger in a detection area of the sensor surface arrangement (12g). The sensor surface arrangement (12g) provides an electrical trigger signal based on detection of the presence and/or movement of at least part of the hand for triggering the vehicle component(s).

14 Claims, 5 Drawing Sheets

MOTOR VEHICLE ROOF WITH A CONTROL MEANS FOR ELECTRICAL MOTOR VEHICLE COMPONENTS AND PROCESS FOR OPERATING ELECTRICAL MOTOR VEHICLE COMPONENTS

BACKGROUND OF THE INVENTION

1. Field of the Invention

This invention relates to a motor vehicle roof with a control means for operating at least one electrical motor vehicle component by a passenger of the vehicle and a corresponding process for operation of at least one electrical vehicle component.

2. Description of Related Art

The interior of modern motor vehicles generally houses a host of electrical controls which must be manually actuated by the driver or by passengers of the vehicle to operate motor vehicle components (for example, slide switches, rotary switches or pushbuttons).

Controls which are considered especially important in practice (for example, for the headlights, windshield wipers, etc.) must generally be located within the immediate visual range of the driver, i.e., in the area of the vehicle interior which the driver can easily survey while driving "with a glance forward" without greater distraction from ambient events and which lies within "reach" of the driver. This area for placement of controls, which is preferred especially for safety reasons, is directly in front of the driver in a motor vehicle so that these controls can be located preferably on the steering column, the dashboard or a center console.

With the increasing comfort in modern motor vehicles and the associated rise in the number of control functions to be performed, the arrangement of controls within sight of the driver has become more and more difficult for reasons of space.

To solve this space problem, attempts have already been made to implement numerous control functionalities at the same time by a single control means with which the functions can be selected, for example, in a "menu structure". This choice can be made, for example, by means of several buttons and/or a type of "joystick". The disadvantage here is that this choice of control functions is rather time-consuming, and thus, unduly distracts the driver.

Mainly for controls which can be considered less important with respect to driving safety and which are to be activated especially rather infrequently, in their arrangement, there has been a switch to areas of the vehicle interior which are not in direct sight of the driver. Examples of this in motor vehicles include the operation of electrical windows by controls on the driver's side inner door panel, the operation of electrically adjustable outside mirrors by controls on the armrest console which is located in the middle next to the driver's seat when viewed in the transverse direction of the motor vehicle, or the operation of a roof opening system (for example, sliding and lifting roof, louvered roof, etc.) by controls on the motor vehicle roof area. The disadvantage here is that the operation easily distracts the driver and so-called "blind operation" is difficult or requires a corresponding routine of the operator.

In the known controls, the function of which is based on pressing, pulling or turning an actuating element, it is furthermore a disadvantage that these controls are subject to more or less extensive wear of the mechanical parts. Regardless of this, in general, their design must be carefully matched to the interior of the pertinent motor vehicle. In this respect, in practice, it is generally not a matter of standard controls, but components and assemblies of complex construction and design. Moreover, the arrangement of individual controls or control assemblies has the disadvantage that variance of the vehicle equipment (for example, with or without a sliding roof, with or without outside mirror adjustment, etc.) entails a corresponding variance of the corresponding interior panel parts or consoles which are designed for housing these controls or the combination of controls which is desired for the special vehicle model. Finally, for the operation of a control which is to be mechanically actuated, in the dark, it is difficult to find the control, mainly if it is not lighted and/or it is out of direct sight of the operator. In this connection, it is noted that permanent lighting (also for example, background lighting) of controls in the dark is often perceived as disturbing by vehicle passengers.

Published German Patent Application DE 196 49 573 A1 discloses an input device, especially a computer input device, with which hand movements can be detected and transmitted to terminal devices. The known device can be used, for example, to control a mouse in a text processing program, two-dimensional movements being detected as the displacement of a pressure point on a piezo-sensory surface.

Published German Patent Application DE 43 12 672 A1 discloses a proximity, mouse-compatible pointer input device for controlling the motion of a cursor or a pointer on a screen, for example, instead of a computer mouse, the hand or the finger of the operator being moved in the vicinity of the sensor field.

Published German Patent Application DE 42 01 934 A1 discloses a data processing system which is controlled by forms of expression of human gestures, specifically by taking pictures of the human body or parts of it and translation of the forms of expression extracted therefrom into commands for controlling the data processing system.

In May 2003, ASIC products of the company Elmos Semiconductor AG were presented at the Internet site "www.elmos.de". With reference to the product labeled E909.01 ("Optical Switch with High Ambient Light Immunity"), a switch means based on an optical detection principle was described with which, through a translucent surface, the approach of a finger, contact of the surface with the finger or movement of the finger on the surface can be detected.

Similar sensor controls were presented and described at the Internet site "www.mechaless.de" in May 2003, such as, for example, optical proximity sensors, optical switches and optical linear regulators in which the sensor technology is located hidden behind the surface of the control.

SUMMARY OF THE INVENTION

A primary object of this invention is to provide a control means which can be comfortably actuated and a comfortable process for operation of at least one electrical component of a motor vehicle.

This object is achieved with a motor vehicle roof with a control means for operating at least one electrical motor vehicle component by a passenger of the vehicle, the control means having a sensor surface arrangement for detecting at least one of the presence and movement of at least part of a hand of the passenger in a detection area of the sensor surface arrangement and providing an electrical trigger signal for triggering at least one vehicle component in response to a detection signal from said sensor surface arrangement.

This object is also achieved by a process in which the detection of the presence and/or movement of the hand or part of the hand of a passenger of a vehicle in a detection area of a sensor surface arrangement of a control means located in the vehicle roof area causes an electrical trigger signal to be issued for triggering a vehicle component.

By detecting the presence and/or motion of at least part of the hand of the passenger, ergonomically advantageous operation with lower demands on accuracy of the manual control process (fine motor function) can be accomplished which therefore can take place more or less "blindly". This is especially comfortable and safe for the driver of the vehicle since his attention with respect to traffic is only slightly adversely affected by operation. The "detection area," therefore that area of space in which the control actions can be detected based on the structure of the sensor technology used, extends preferably a few centimeters downward from the surface of the sensor surface arrangement so that "proximity" detection processes are enabled.

Therefore, with the invention, a control means which can be actuated especially comfortably is provided in the roof area of the motor vehicle. Here, by a suitable assignment between certain control actions (for example, hand movements) and certain trigger functions, a rather "intuitive" control possibility can be implemented. The triggered components, for example, lighting units and roof opening system components, can be operated by simply approaching or touching surfaces (operating surfaces). Approaching can be designed as simple detection of the hand or the finger of the operator in the vicinity of the sensor surface arrangement. In a structurally simple manner, even gesture recognition can be implemented by the invention when, for example, a "hand wiping motion" on or near an operating surface is intended as a control action.

In addition, the control means does not require mechanical elements which are susceptible to wear and the sensor surface arrangement of the control means can be well matched to the vehicle interior in practice, the latter both with respect to design and also with respect to construction.

In one preferred embodiment, the control means is designed at least for operation of a roof opening system and/or a roof shading system and/or an interior lighting system. Here, the advantage arises that especially intuitive operation is enabled, on the one hand, based on the spatial vicinity of the components which are to be operated and the control means which is intended for this purpose, and on the other hand, based on the possibility of obvious correspondence between the actuation movements (hand movements) and the movement functions of the indicated components.

Especially good accessibility of the control means is achieved, for example, when it is located roughly in the middle when viewed in the transverse direction of the motor vehicle, for example, in the middle in the transition area between the motor vehicle roof and vehicle windshield. Mainly, in this area, the control means as a control unit or control console with a visible side formed by the sensor surface arrangement can be well matched to the respective interior design. In one preferred embodiment, the sensor surface arrangement is formed as a one-piece plastic molding. In particular, with the invention, a control unit for roof opening systems and interior lighting systems for integration into a roof module for motor vehicles can be formed.

Preferably, the sensor surface arrangement has a host of sensor elements which are hidden (not visible). The expression "sensor element" here means a sensor which implements part of the detection functionality which is desired overall and can provide a sensor signal independently of other sensors.

If there is plurality of sensor elements, these elements interact preferably at least in some of the intended detections. Detection can performed, for example, optically (especially infrared-optically), capacitively, by means of ultrasound or by means of piezosensor technology. These detection principles in themselves are well known from the prior art so that they need not be explained in detail here. For example reference should be made to the initially mentioned publications in which suitable detection principles are explained.

The arrangement of a plurality of sensor elements is advantageous in many respects. First of all, it is thus possible to assign to individual functions of the desired operating functions their own sensor element which is located on or behind an "operating surface" and thus to achieve "multifunctionality" of the control means. Furthermore, for the same control function, there can also be several sensor elements in order to increase the detection accuracy by a certain redundancy during detection and/or to distribute the tasks for detection of the corresponding control process among several sensor elements with respect to a certain control function. For example, the detection of the touch of a finger on a section of the sensor surface arrangement by means of a combination of an optical proximity sensor with a capacitive or piezoelectric pressure sensor can be acquired.

Furthermore, the arrangement of a plurality of sensor elements is also advantageous when, for a certain operating function, a three-dimensionally extended section of the detection area with simultaneously a detection sensitivity as uniform as possible is to be achieved in this section of the detection area. For example, several identical sensor elements which each detect only at short range can be arranged distributed over the surface (for example, over the extension of an operating surface) in order to "extend" the detection sensitivity with respect to this operating function more strongly in three-dimensional terms (the sensitive area of the sensors is distributed over a larger surface).

Finally, the arrangement of a plurality of simple sensor elements each of which can detect only presence or proximity can be advantageously used for detection of motion (direction and/or speed). In this way, for example, using two sensor elements which can detect simply the presence or the distance of a hand, a "wiping motion" of the hand in the direction of an imaginary connecting line between the two sensor elements can be detected by jointly evaluating the sensor signals which have been output by the sensor elements, and for example, determining the speed and orientation of the hand motion. This function of detection of (also three-dimensional) movements of the hand of the operator or parts of this hand, which detection is as accurate as possible, can be achieved even better in practice with an increasing number of sensor elements which are arranged in a distributed manner.

For reliable detection and low fault susceptibility, it has been found to be advantageous if the motor vehicle roof, especially the control means itself (for example, directly behind the sensor surface arrangement) has evaluation electronics with which the sensor signals which have been output from the sensor elements of the sensor surface arrangement can be evaluated and depending on the result of this evaluation, an electrical trigger signal can be output. Thus, disruptive influences which act on the output signals of sensor elements in their transmission (for example, by electromagnetic interference) are largely avoided.

In one embodiment, the sensor surface arrangement comprises a plurality of sensor elements with output signals which are jointly evaluated by the evaluation electronics in order to issue the electrical trigger signal depending on the result of this evaluation, and each of these sensor elements cannot be assigned to a certain motor vehicle component, but only the prepared electrical trigger signal (optionally also depending on the "operating prehistory") can be assigned to a certain vehicle component and functionality of this vehicle component.

In one preferred embodiment the sensor surface arrangement has at least one operating surface. The concept "operating surface" will designate a two-dimensionally extended section of the detection area which is intended altogether for detection relating to the operation of a certain motor vehicle component or relating to an elementary control function. In this sensor, for example, an operating surface can be intended for operation of a roof opening system (component-referenced operating surface). There can also be an operating surface for turning on an interior light and another operating surface for turning off the same interior light (control function-referenced operating surface).

Quite in general, there can be proximity detection at a short distance from the operating surface and/or detection in which the operating surface must be touched (wiping or tapping) (for example, as in a "touchpad").

It is conceivable that the assignment of an operating surface to a certain component or functionality is dependent on the "operating prehistory." One example of this would be the following arrangement of two operating surfaces: With a first operating surface, by (repeated) tapping, one of several components is "selected," for example, a certain outside mirror, a shade or an interior light. The selection can be clearly shown to the user acoustically and/or visually (signal lighting). Then, on a second operating surface, by a "hand wiping movement," a functionality of the component which was selected before, which functionality is assigned to the direction of this motion, is commanded.

A camber of the operating surface is advantageous with respect to blind operation and the differentiation between operating surfaces when the sensor surface arrangement has several operating surfaces, as can be advantageous for implementation of more complex control functions. Alternatively or in addition to a camber, there can also be a rough surface structure in order to facilitate "finding" the operating surface by the "tactile" impression at the operator.

An operating surface which is concavely arched when viewed from the operator or an operating surface which is located in a depression enables embodiments in which actuation of the respective operating surface can hardly take place unintentionally, for example, when the camber or the depression is dimensioned such that actuation is not possible by the entire hand, but only by one finger.

Moreover, such a concavely arched operating surface can be advantageously used in the detection of a "contacting wiping motion." In this case, the hand or the finger of the user can be easily guided by the shape of surface during the motion. This guidance, then, on the one hand, has the advantage that the path of motion which is necessary for operation is more or less forced, and on the other hand, by the camber at the end of the path of motion, the hand or the finger can be gently pushed away from the roof area again.

In one preferred embodiment with several operating surfaces which are combined into a sensor surface unit, it is provided that the operating surfaces which are adjacent to one another differ in their orientation and/or camber and/or tactile nature. To prevent improper operation by confusion of operating surfaces, it is advantageous if the operating surfaces which are adjacent to one another are separated from one another by insensitive "separation surfaces." If there are several operating surfaces, it is finally preferred that this surface arrangement, especially the sensor surface arrangement altogether, has a plane of symmetry.

In another embodiment, the sensor surface arrangement has means for providing visual operating instructions. For example, the corresponding fixed labels and/or pictograms on the visible side of the sensor surface arrangement are conceivable. Even if these operating instructions can be easily printed, in one preferred embodiment, it is provided that at least some of these operating instructions visually stand out due to background lighting of a corresponding template, this background lighting for example, being activated upon approach (of the hand) (and then preferably, a predetermined time interval is maintained) even before any other operating function can be initiated. Alternatively or in addition, this first approach can also be used to illuminate at least the sensor surface arrangement, either by a light which is intended especially for this purposes, or a light which is also intended for illumination of the interior anyway.

In one preferred embodiment, the motor vehicle roof, especially the control means itself, comprises an acoustic signal transmitter for output of acoustic signals in reaction to detections ("acoustic feedback"). Thus, for example, successful evaluation of the sensor signals which are associated with a hand movement, i.e., the detection of a certain control command, can be acoustically confirmed and/or an unsuccessful evaluation which accordingly does not trigger a control function can be acoustically communicated as improper operation. In the simplest case, the acoustic signals can be two different sounds or tones in order to confirm a control command or to reject it as a improper operation, especially for more complex control tasks, an electronic voice output can be advantageously used for more accurate feedback.

The invention is explained in detail below using certain embodiments with reference to the accompanying drawings.

BRIEF DESCRIPTION OF THE DRAWINGS

FIG. 8 shows a representation relating to proximity to a sensor surface arrangement;

FIG. 9 shows a representation relating to encroachment on the sensor surface arrangement, FIG. 10 shows a representation relating to a wiping motion on the sensor surface arrangement, FIG. 11 shows a representation relating to tapping of the sensor surface arrangement with the back of the hand, and FIG. 12 shows a representation relating to tapping of the sensor surface arrangement with one finger.

DETAILED DESCRIPTION OF THE INVENTION

Figure 1:
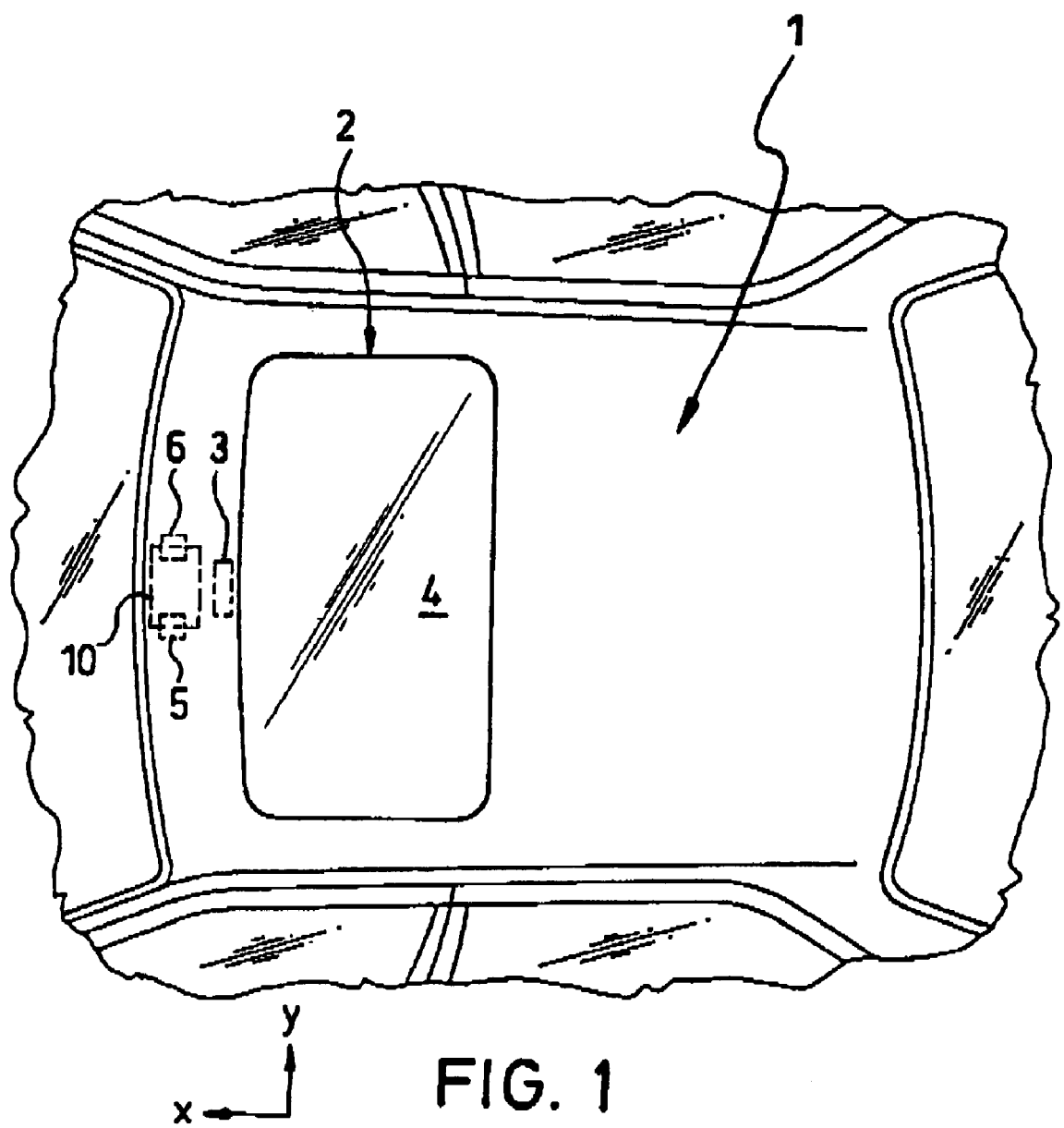
FIG. 1 is a plan view of a motor vehicle roof for illustrating the arrangement of a control means as of the invention.

FIG. 1 shows the roof 1 of a motor vehicle with a sliding roof 2 which can be actuated in the conventional manner by means of an electric drive 3 for opening and closing of the roof opening by means of a sliding cover 4. Furthermore, the figure shows a left interior light 5 and a right interior light 6 which in the conventional manner are located on the underside of the vehicle roof 1 between the front roof edge and the roof opening.

In the figure, the directions to which reference is made below are drawn in, specifically, the lengthwise direction x of the motor vehicle, the transverse direction y and the vertical direction z of the motor vehicle.

The sliding roof 2 and its electric drive 3 and the interior lights 5, 6 are components of the vehicle electrical system which can be triggered by a control means 10 which is likewise located on the underside of the vehicle roof 1. For this purpose, the control means 10 comprises a sensor surface arrangement which is exposed downward toward the vehicle interior through a section of the inside headliner for detection of the presence or proximity and movement of the hand or finger of the operator. By means of this sensor surface arrangement, the functions of the motor vehicle components 3, 5, 6 can be comfortably controlled by the driver who, for this purpose, need execute only predetermined hand and/or finger movements in the detection area of the sensor surface arrangement; this itself requires only little attention from the driver while driving and also in the darkness.

In contrast to the described embodiment, the control means 10 could also be designed to trigger other or further motor vehicle components. Moreover, the control means 10 could also be located elsewhere, i.e., a location accessible by the driver or other passengers of the vehicle, on the bottom of the vehicle roof 1. For example, to operate lighting means located further to the rear in the vehicle interior, alternatively or additionally, there could be a control means behind the sliding roof 2 which can be comfortably operated by the back seat passengers.

Advantageously, in the operation of the sensor surface arrangement, no mechanical parts are moved so that the control means, in this respect, works without wear. One or more sensor surface arrangements can be integrated in an aesthetically pleasing manner in the inside headliner of the vehicle which is present anyway or can be provided as a section of such an inside headliner. For simple vehicle installation it is advantageous if the vehicle roof is made as a so-called prefabricated roof module which has vehicle components which are located in the roof area in the finished vehicle, especially has the roof opening system 2 which is provided in this embodiment already integrated. In this case, the control means can also be integrated within the framework of prefabrication of the roof module.

In the following description of other embodiments, for analogous parts, the same reference numbers are used, with a lower case letter added to distinguish the embodiment. Here, essentially only the differences from the already described embodiment or embodiments are explained in detail, and otherwise, reference is made expressly to the description of previous embodiments. The reference numbers of parts which are repeatedly provided in an embodiment but which are analogous in their action are numbered consecutively (each with a hyphen and a sequence number added). Reference is made to individual ones of these parts or to the totality of these parts below also by the reference number without an addition.

FIGS. 2 to 7 illustrate, for example, some embodiments of a sensor surface arrangement, which is produced in one piece from plastic and which is suitable for the invention, as can be provided, for example, for the control means 10 which is shown in FIG. 1. These figures do not show the sensor technology which is used and which is provided in the form of a sensor arrangement located distributed over (in the positive z-axis direction) the visible side, together with the evaluation electronics.

Figure 2:
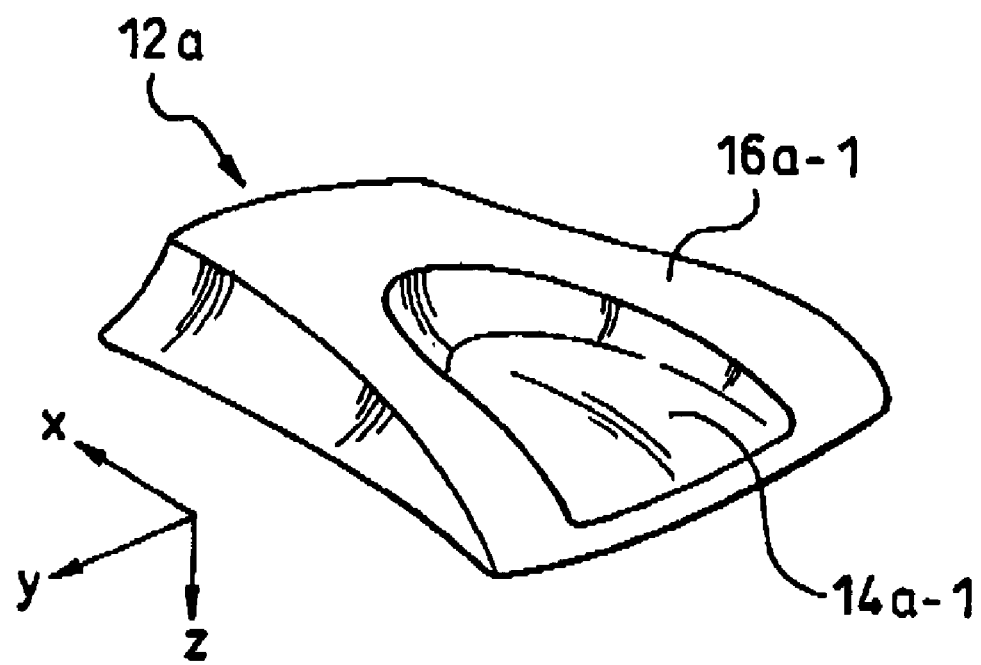
FIGS. 2 and 3 are perspective views of sensor surface arrangements which are used within the framework of the invention with one operating surface.

FIG. 2 shows a first sensor surface arrangement 12a which has an operating surface 14a-1 in the middle rear area and a separation surface 16a-1 which extends around the front of surface 14a-1 in roughly a U-shape. Viewed in the x-axis direction, the separation surface 16a-1 rises (in the negative z-axis direction) at an angle of roughly 20° and is, for the most part more or less even, conversely the operating surface 14a-1, forms a largely curved trough surface with a front transition area (toward the separation surface 16a-1), viewed in the z-axis direction, which runs roughly in the shape of a parabola. The transition between the surfaces 14a-1 and 16a-1 forms a roughly square edge at least in the front part of the surface arrangement.

Figure 3:
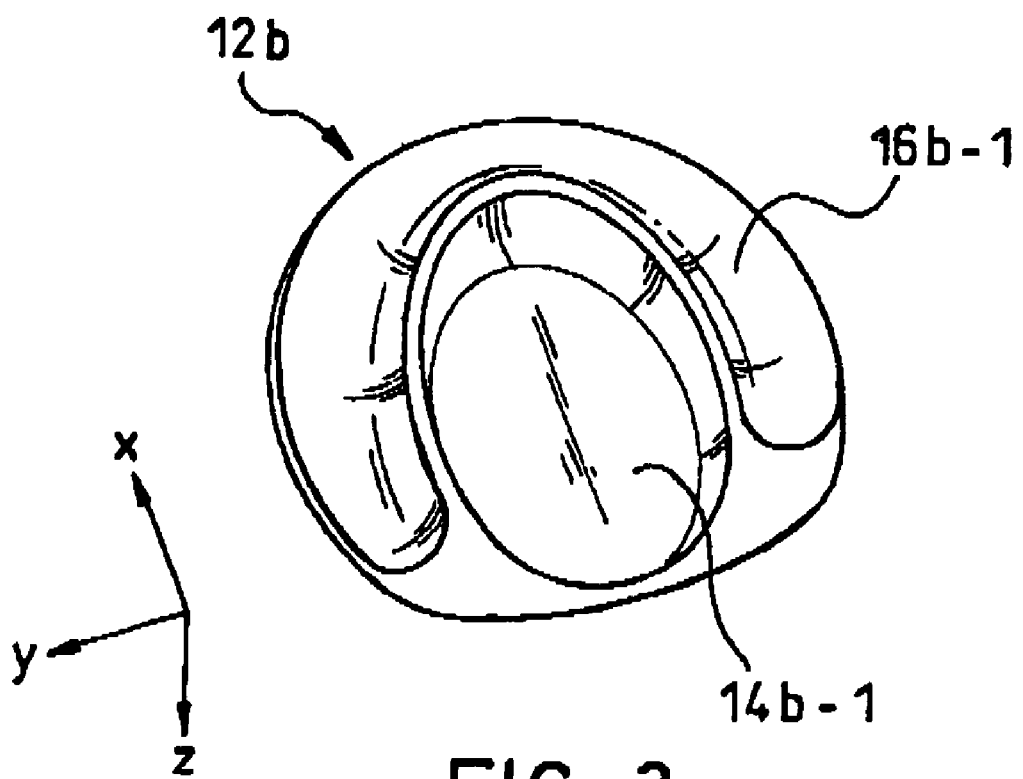

FIG. 3 shows a sensor surface arrangement 12b with a concave, roughly semi-ellipsoidal operating surface 14b-1 which is surrounded toward the front (when viewed in the z-axis direction) by a roughly U-shaped separation surface 16i-1, the transition area between these two surfaces forming a raised U-shaped collar.

Figure 4:
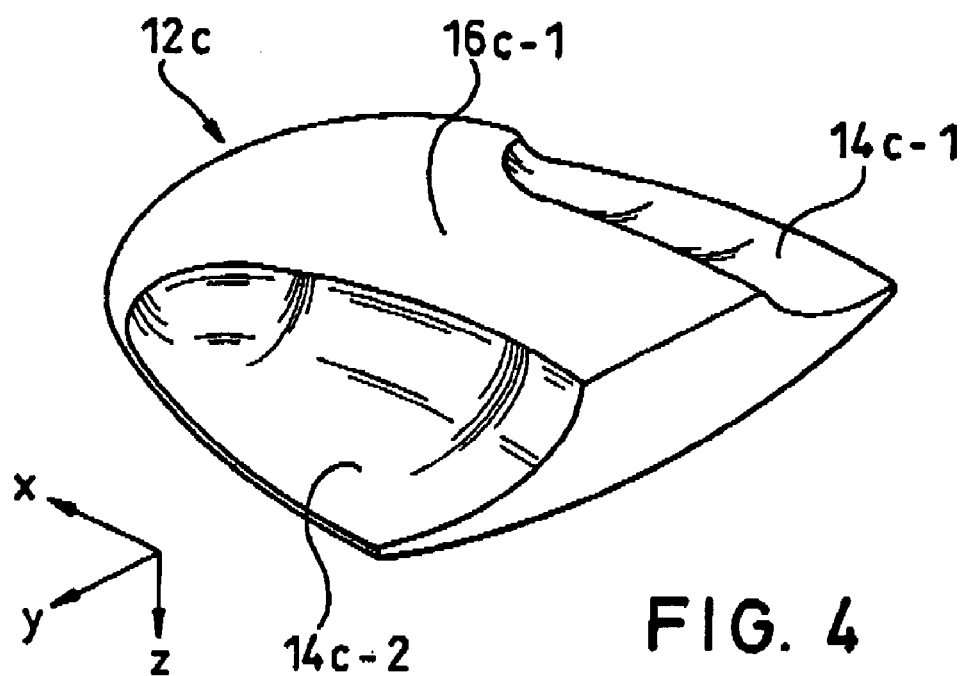
FIG. 4 is a perspective view of a sensor surface arrangement which can be used within the scope of the invention with two operating surfaces.

FIG. 4 shows a sensor surface arrangement 12c with a separation surface 16c-1 which is raised in the center and runs slightly convexly curved, and which is adjoined when viewed in the transverse direction on either side by concavely curved operating surfaces 14c-1 and 14c-2 over a transition area which is curved at roughly a right angle. On the rear outer areas of the sensor surface arrangement 12c, the operating surfaces 14c run smoothly into the plane of the surrounding inside headliner (not shown).

Figure 5:
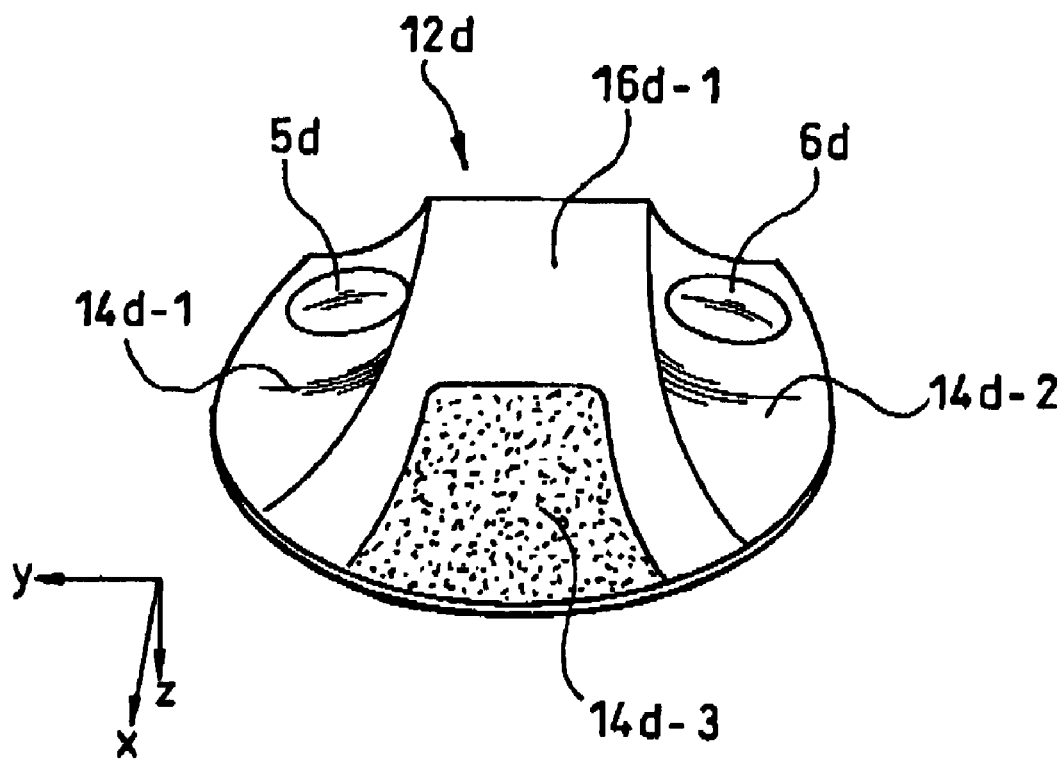
FIGS. 5-7 show perspective views of sensor surface arrangements which are used within the scope of the invention with three operating surfaces.

FIG. 5 shows a sensor surface arrangement 12d with a raised separation surface 16d-1 which has a roughly square surface section in the center which is adjoined, when viewed in the transverse direction, on either side via a transition area which is angled at roughly 45°, by the operating surfaces 14d-1, 14d-2, and toward the front likewise via an angled transition area by another surface section of the separation surface 16d-1. The latter section of the separation surface 16d-1 is slightly concavely curved and is roughly U-shaped, a smooth transition taking place from the U-shape to the third operating surface 14d-3. Furthermore, it is apparent that the interior lights (here reading lights) 5d and 6d are integrated into the operating surfaces 14d-1, 14d-2.

Operation of the components 5d, 6d takes place in an intuitively simple manner via the operating surfaces 14d-1 and 14d-2. The operating surface 14d-3 has a rough surface structure over its entire extension and which can be easily felt with the fingers, especially in the dark. For the interior lights 5d, 6d, the sensor technology is to a certain extent installed in the lights (lights and control means form a unit). When the hand or the finger approaches the operating surfaces 14d-1, 14d-2, for example, the corresponding light 5d and 6d can be turned on with low light intensity. In this way, search lighting is superfluous.

Figure 6:
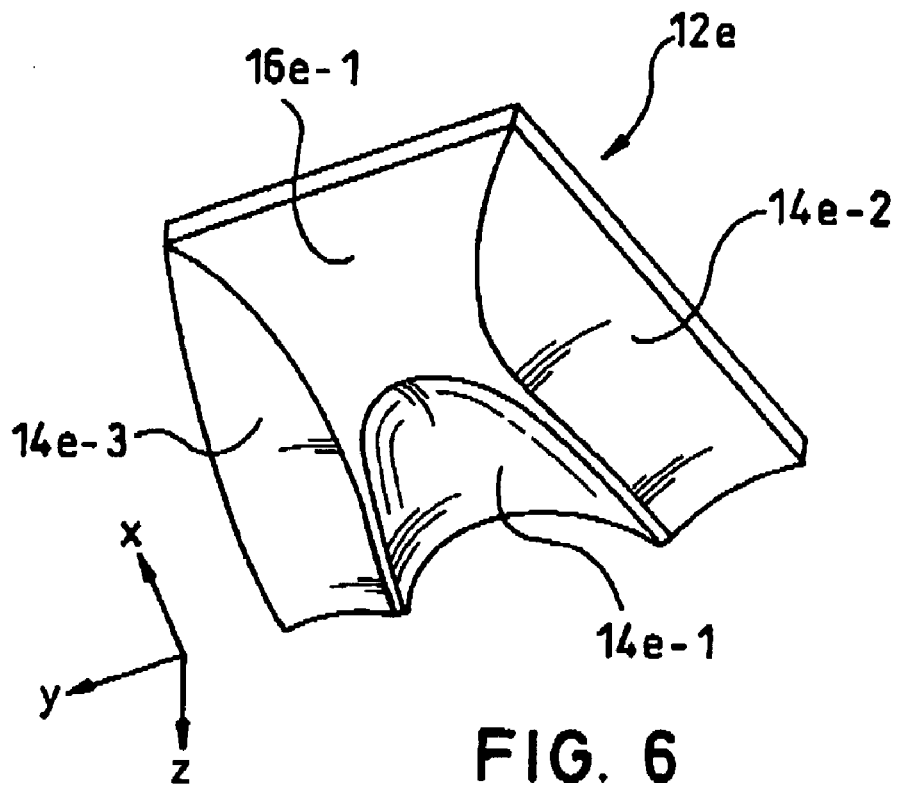

FIG. 6 shows a sensor surface arrangement 12e which has an operating surface 14e-1 in the middle rear area which constitutes a trough surface which runs, for the most part, concavely curved with a transition area which runs forward, viewed in the z-axis direction, roughly in the shape of a parabola, to a separation surface 16e-1. This separation surface 16e-1 continues on either side of the operating surface 14e-1 roughly smoothly to narrow ridge surfaces which run roughly evenly the x-axis direction on a "collar". Over the entire extension of the sensor surface arrangement 12e, viewed in the x-axis direction, on the lateral edges of this arrangement, there are two additional concavely indented operating surfaces 14e-2 and 14e-3. The two operating surfaces 14e-2, 14e-3, on the one hand (for example, for light), and 14e-1 on the other hand (for example, for a roof system), are formally separated from one another by the collar. This results in gentle guidance of the hand or finger in the area of the surface 14e-1. In particular, the inner area (roof system operation) follows the natural movement from the wrist with its concave shape. The collar area of the concave surface has a steeper angle. This advantageously results in the hand being slowed down in movement to the collar.

Figure 7:
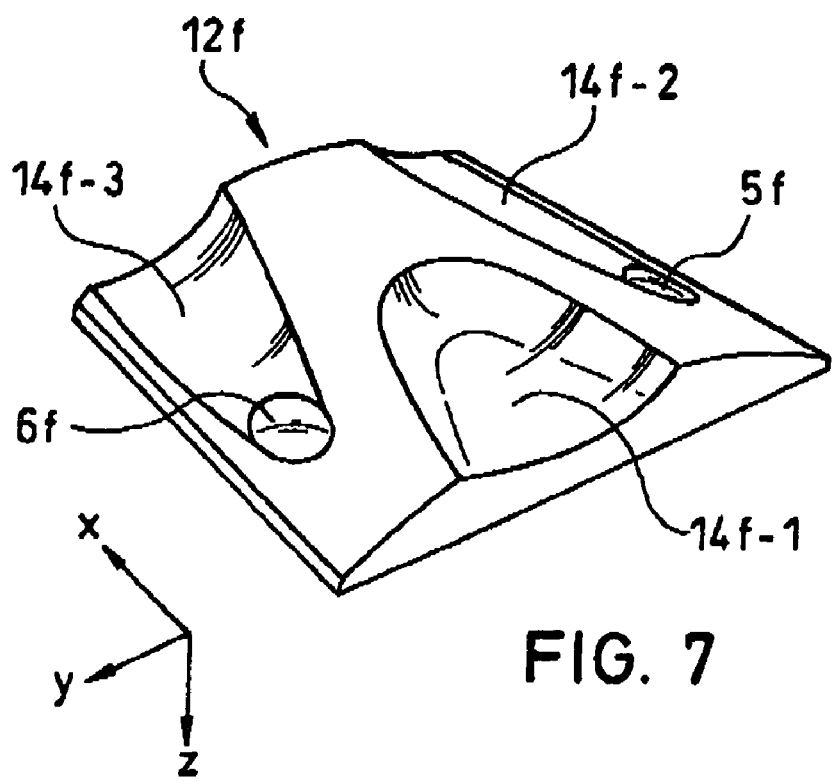

FIG. 7 shows a sensor surface arrangement 12f that is similar to the arrangement 12e which is shown in FIG. 6; however, the external operating surfaces 14f-2 and 14f-3 widen instead of tapering toward the front in their transverse extension. Moreover, in this embodiment, interior lights 5f and 6f are again integrated within the operating surfaces 14f-2, 14f-3.

With reference to FIGS. 8 to 12, some of the control actions of interest within the scope of the invention are explained below.

Figure 8:
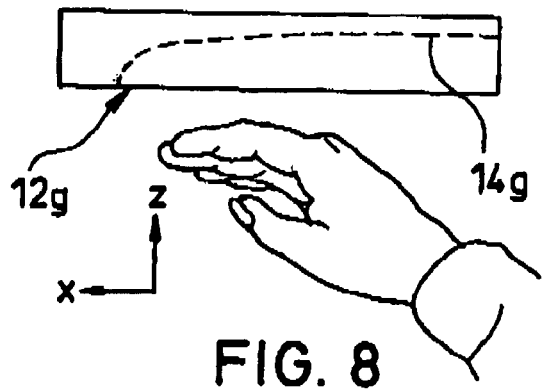
FIGS. 8 to 12 are schematics for illustrating the control concepts which can be used within the framework of the invention, specifically

FIG. 8 schematically shows a sensor surface arrangement 12g with an operating surface which is indicated at 14g and which runs recessed, with sensor technology which detects the approach of a hand at a relatively great distance (for example, roughly 5 cm) and converts it by means of evaluation electronics into an operation-trigger signal, for example, for turning on an interior lighting means with low intensity ("dim light").

Figure 9:
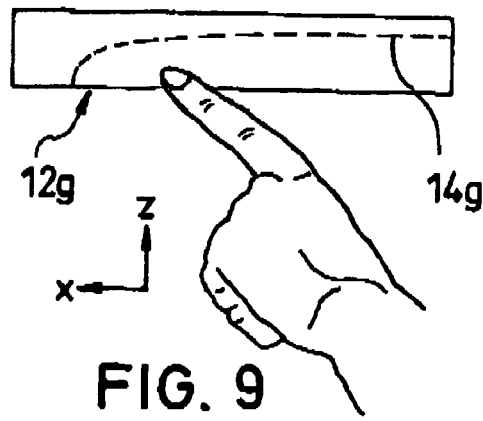

FIG. 9 illustrates another control action on the same sensor surface arrangement 12g, specifically an approach to the operating surface 14g at a much shorter distance, as is possible in practice only by "encroachment" on the sensor surface arrangement 12g. By the operating surface 14g being made as the base of an indentation which is relatively small in the directions of its transverse extension, it can be provided, for example, that this encroachment can take place only with the finger, but not with the entire back of the hand. This is advantageous for preventing unintentional initiation of the trigger function which is associated with this control action.

Figure 10:
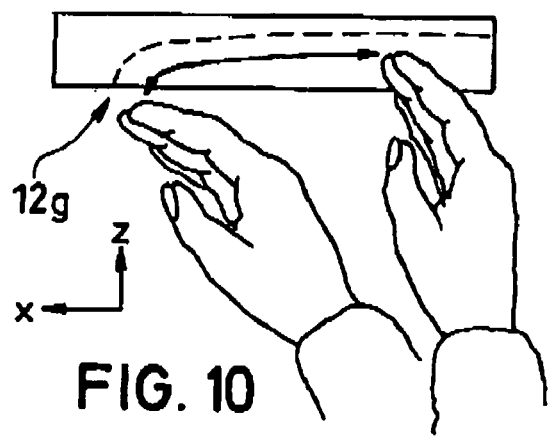

FIG. 10 shows two other control actions on the same sensor surface arrangement 12g, specifically "wiping forward" (in the positive x-axis direction) and "wiping backward" (in the negative x-axis direction). These control actions which are characterized by the direction of motion can be advantageously used to implement intuitive control functions which are linked to a corresponding direction of movement. In the vehicle shown in FIG. 1 for example, with the wiping motion forward, it would be possible to command closing of the sliding roof 2, therefore movement of the sliding cover 4 forward, and with a wiping motion to the rear, accordingly, the opening of the sliding roof 2 could be commanded. In contrast to the embodiment shown in FIG. 1, if there is a transparent cover for the roof opening system, the wiping motion forward with the roof opened could command the corresponding closing motion of an assigned shading means (such as a blind) and with the roof opening already shaded, the closing motion of the transparent sliding cover could be commanded. Conversely, in a wiping motion to the rear with the roof opening closed and shaded, first, the shading means could be activated in the sense of clearance of the roof opening and upon repeated wiping to the rear only the roof opening could be opened.

Figure 11:
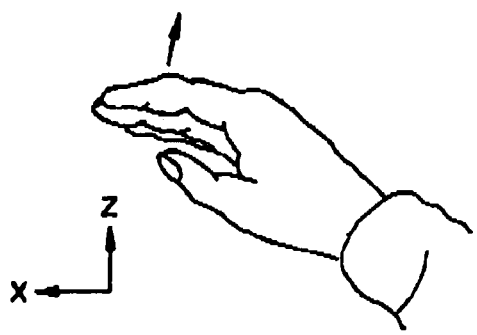
Figure 12:
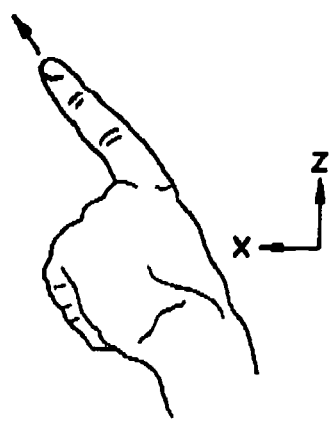

Regardless of the specific configuration of the control means, FIGS. 11 and 12 illustrate the execution of other control actions, specifically tapping an operating surface with the back of the hand (FIG. 11) and tapping the operating surface with a finger (FIG. 12).

One simple use of the invention comprises, for example, is the control concept as an operating surface for the roof opening system that is housed in a trough in the roof bracket. The shape of the trough follows the shape and the natural motion of the hand.

With this arrangement, for example, the following operation of the roof opening system is possible:
automatic opening after a wiping motion backwards
automatic closing after a wiping motion forwards
stopping of an automatic motion by tapping
complete closing of the roof opening system after a double tap.

What is claimed is:

1. Motor vehicle roof with a control means for operating at least one electrical motor vehicle component by a passenger of the vehicle, the control means having a sensor surface arrangement for detecting at least one of the presence and movement of at least part of a hand of the passenger in a detection area of the sensor surface arrangement and providing an electrical trigger signal for triggering at least one vehicle component in response to a detection signal from said sensor surface arrangement;
wherein said sensor surface arrangement comprises a plurality of sensor elements and wherein the sensor elements comprise at least one of capacitive, ultrasound and piezoelectric sensors that are arranged for detecting a plurality of different types of finger movements, and wherein the control means triggers a different operation in response to each of said plurality of different types of finger movements.

2. Motor vehicle roof as claimed in claim 1, wherein the at least one vehicle component is at least one of a roof opening system, a roof shading system and an interior lighting system.

3. Motor vehicle roof as claimed in claim 1, wherein the sensor surface arrangement is located in the middle when viewed in the transverse direction of the vehicle.

4. Motor vehicle roof as claimed in claim 1, wherein the plurality of sensor elements are in a hidden location.

5. Motor vehicle roof as claimed in claim 1, comprising evaluation electronics which evaluate sensor signals which have been output from the sensor elements of the sensor surface arrangement and depending on the result of this evaluation, provide said electrical trigger signal.

6. Motor vehicle roof as claimed in claim 1, wherein the sensor surface arrangement has at least one arched operating surface.

7. Motor vehicle roof as claimed in claim 6, wherein the at least one arched operating surface has a rough surface.

8. Motor vehicle roof as claimed in one of claims 1, wherein the sensor surface arrangement has means for providing visual operating instructions.

9. Motor vehicle roof as claimed in claim 1, comprising an acoustic signal transmitter for outputting acoustic signals in reaction to detections.

10. Motor vehicle roof with a control means for operating at least one electrical motor vehicle component by a passenger of the vehicle, the control means having a sensor surface arrangement for detecting at least one of the presence and movement of at least part of a hand of the passenger in a detection area of the sensor surface arrangement and providing an electrical trigger signal for triggering at least one vehicle component in response to a detection signal from said sensor surface arrangement; wherein the sensor surface arrangement has a plurality of operating surfaces, one of the operating surfaces having sensor means for detecting tapping movements and another of the operating surfaces having sensor means for detecting wiping movements.

11. Process for operation of at least one component of a motor vehicle by a control means located in a vehicle roof area by a passenger of the vehicle, comprising the steps of:
  detecting at least one of the presence and movement of at least part of the hand of the passenger in a detection area of the sensor surface arrangement, and
  producing an electrical trigger signal for triggering a vehicle component in response a positive indication that at least one of the presence and movement of at least part of the hand of the passenger has occurred in the detection area in said detecting step;
  wherein at least one of capacitive, ultrasound and piezoelectric sensors are utilized for detecting each of a plurality of different types of finger movements during said detecting step, and wherein a different operation is triggered in response to each of said plurality of different types of finger movements during said producing step.

12. Process as claimed in claim 11, wherein said at least one component is a roof opening system.

13. Process as claimed in claim 12, wherein said plurality of different types of finger movements comprise each of backward wiping, forward wiping and tapping motions.

14. Process for operation of at least one component of a motor vehicle by a control means located in a vehicle roof area by a passenger of the vehicle, comprising the steps of:
  detecting at least one of the presence and movement of at least part of the hand of the passenger in a detection area of the sensor surface arrangement, and
  producing an electrical trigger signal for triggering a vehicle component in response a positive indication that at least one of the presence and movement of at least part of the hand of the passenger has occurred in the detection area in said detecting step;
  wherein said at least one component is a roof opening system;
  wherein detection of:
  a backward wiping motion triggers automatic opening of the roof,
  forward wiping motion triggers automatic closing of the roof,
  tapping stops said automatic opening and closing, and
  a double tap triggers complete closing of the roof opening system.

* * * * *